United States Patent
Zaitsu (10) Patent No.: US 8,467,195 B2
(45) Date of Patent: Jun. 18, 2013

(54) ELECTRONIC APPARATUS

(75) Inventor: Masayuki Zaitsu, Kagahara (JP)

(73) Assignee: KYOCERA Corporation, Kyoto (JP)

( * ) Notice: Subject to any disclaimer, the term of this patent is extended or adjusted under 35 U.S.C. 154(b) by 607 days.

(21) Appl. No.: 12/339,609

(22) Filed: Dec. 19, 2008

(65) Prior Publication Data

US 2009/0175018 A1 Jul. 9, 2009

(30) Foreign Application Priority Data

Dec. 27, 2007 (JP) .................. 2007-337685

(51) Int. Cl.
*H05K 7/14* (2006.01)
*H05K 5/00* (2006.01)
*H04M 1/00* (2006.01)

(52) U.S. Cl.
USPC ...... 361/800; 361/801; 361/802; 361/679.02; 361/679.08; 361/679.09; 455/575.1; 455/575.3; 455/575.4

(58) Field of Classification Search
USPC ............. 361/679.01, 679.02, 679.55–679.59, 361/679.08, 679.09, 679.3; 455/575.1, 575.3, 455/575.4, 575.8; 345/156, 157, 168, 169; 174/535
See application file for complete search history.

(56) References Cited

U.S. PATENT DOCUMENTS

| | | | |
|---|---|---|---|
| 2004/0132511 A1* | 7/2004 | Yamamoto | 455/575.3 |
| 2005/0264982 A1* | 12/2005 | Kim et al. | 361/679 |
| 2006/0199624 A1* | 9/2006 | Imamura et al. | 455/575.1 |
| 2009/0005132 A1* | 1/2009 | Ogatsu | 455/575.3 |

FOREIGN PATENT DOCUMENTS

JP 2007-266895 10/2007

* cited by examiner

*Primary Examiner* — Jayprakash N Gandhi
*Assistant Examiner* — Jerry Wu
(74) *Attorney, Agent, or Firm* — Procopio, Cory, Hargreaves & Savitch LLP (57) ABSTRACT

An electronic apparatus includes: a first circuit board having a mounting surface; a shield casing disposed so as to face the mounting surface of the first circuit board and cover an electronic component mounted on the mounting surface; a battery disposed so as to face the shield casing at a position next to the first circuit board in a first direction which is parallel to the mounting surface of the first circuit board; and a first rib provided on a surface of the shield casing so as to extend in the first direction, one end of the first rib being disposed at a position corresponding to the first circuit board in a second direction, the other end of the first rib being disposed at a position corresponding to the battery in the second direction, the second direction being perpendicular to the mounting surface.

7 Claims, 7 Drawing Sheets

ELECTRONIC APPARATUS

CROSS-REFERENCE TO RELATED APPLICATION

The present application claims priority under 35 U.S.C. §119 to Japanese Patent Application No. 2007-337685, filed DEC. 27, 2007, entitled "ELECTRONIC APPARATUS," the entirety of which is incorporated herein by reference.

BACKGROUND OF THE INVENTION

1. Field of the Invention

The present invention relates to an electronic apparatus such a as mobile cell phone.

2. Description of the Related Art

An example of a portable electronic apparatus, such as a mobile phone, includes a housing and a first circuit board (hereinafter also referred to as a "main circuit board") in the housing. Electronic components are mounted on the first circuit board. To block noise and the like from the electronic components mounted on the main circuit board, a shield casing is attached to the main circuit board.

Another example of a portable electronic apparatus includes a second circuit board (hereinafter also referred to as a "key substrate") and a key unit in addition to the first circuit board. Key switches and light emitting diode (LED) units for illumination are mounted on the key substrate and the key unit is capable of pressing the key switches. In the portable electronic apparatus having such a structure, the key substrate is generally stacked on an upper surface (surface at the side opposite to the main circuit board) of the shield casing.

The portable electronic apparatus, in particular, the mobile phone has been demanded to reduce the size, in particular, the thickness thereof. To comply with such a demand, it is necessary to provide a housing and a shield casing capable of ensuring the strength (in particular the rigidity) of the entire body of the apparatus. Accordingly, high-rigidity material, such as metal, is used as the main material of the shield casing.

Recently, portable electronic apparatuses have been formed so as to have the following structure. That is, the main circuit board is formed such that the length thereof is about one-half of the entire length of the shield casing. The main circuit board is disposed at a section of the shield casing corresponding to about one half of the shield casing near one end thereof, and a battery is disposed in a section corresponding to the remaining half of the shield casing which is free from the main circuit board. Accordingly, the main circuit board and the battery are arranged in the longitudinal direction of the shield casing without overlapping each other in a plan view of the main circuit board (when the main circuit board is viewed in the thickness direction).

In the above-described structure, no rigid body is disposed at the boundary between the main circuit board and the battery, and therefore the strength at the boundary is weaker than the strengths at other regions. This effect is particularly significant in a thin portable electronic apparatus in which the shield casing and the housing are relatively weak. Therefore, it is necessary to increase the rigidity.

SUMMARY OF THE INVENTION

According to one aspect of the invention, an electronic apparatus includes: a first circuit board having a mounting surface; a shield casing disposed so as to face the mounting surface of the first circuit board and cover an electronic component mounted on the mounting surface; a battery disposed so as to face the shield casing at a position next to the first circuit board in a first direction which is parallel to the mounting surface of the first circuit board; and a first rib provided on a surface of the shield casing so as to extend in the first direction, one end of the first rib being disposed at a position corresponding to the first circuit board in a second direction, the other end of the first rib being disposed at a position corresponding to the battery in the second direction, the second direction being perpendicular to the mounting surface.

According to another aspect of the invention, an electronic apparatus includes: a first circuit board; a battery disposed next to the first circuit board on the same plane; a shield casing configured to cover a principle surface of the battery and a principle surface of the first circuit board; and means for reinforcing a boundary between a portion of the shield casing that faces the principle surface of the first circuit board and a portion of the shield casing that faces the principle surface of the battery.

According to further aspect of the invention, an electronic apparatus includes: a first circuit board; a battery disposed next to the first circuit board on the same plane; a shield casing disposed on or above the battery and the first circuit board; and a rib provided on a surface of the shield casing, the rib extending from a point that faces the battery to a point that faces the first circuit board so as to substantially perpendicularly cross a boundary line between the battery and the first circuit board.

DESCRIPTION OF THE PREFERRED EMBODIMENTS

Exemplary embodiments of the invention are now described with reference to the drawings.

Figure 1:
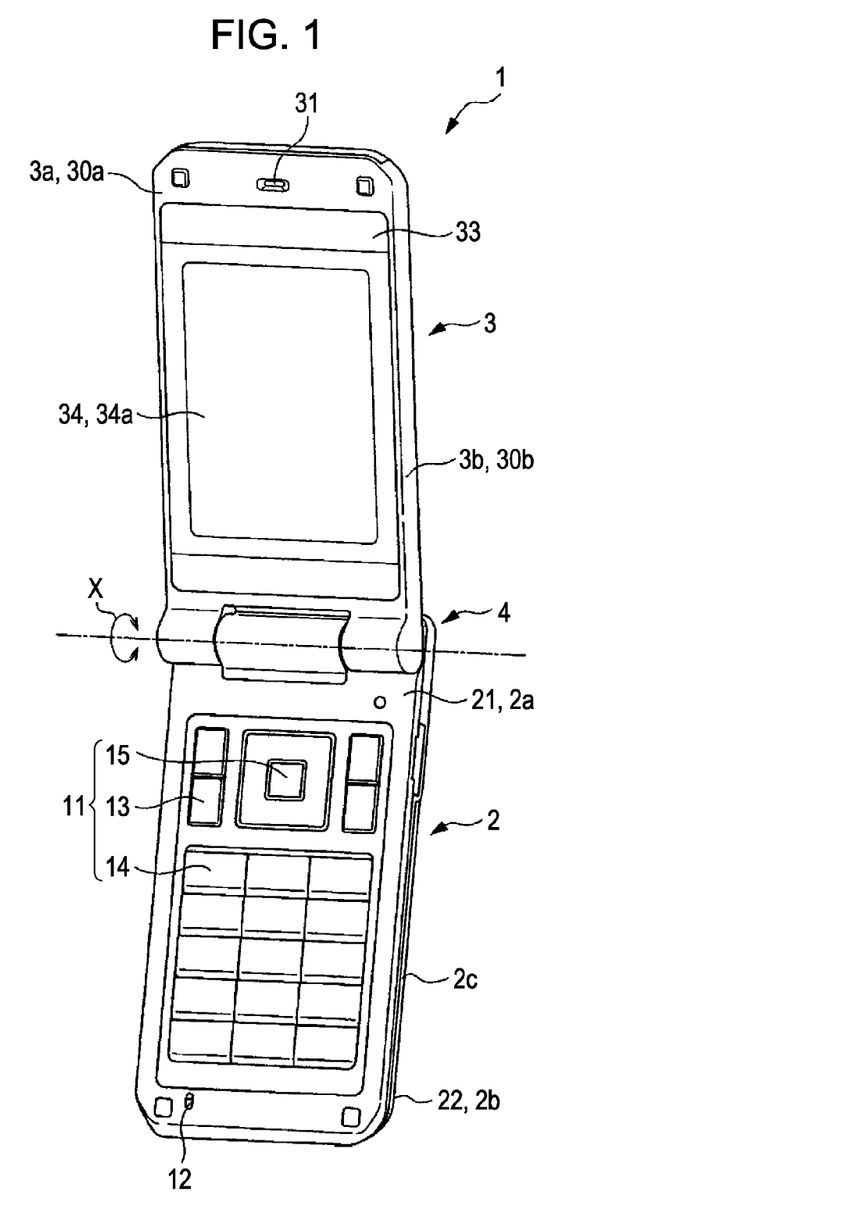
FIG. 1 is a perspective view of a mobile phone including an operation-unit housing and a display-unit housing according to an embodiment of the present invention in an open state.
Figure 2:
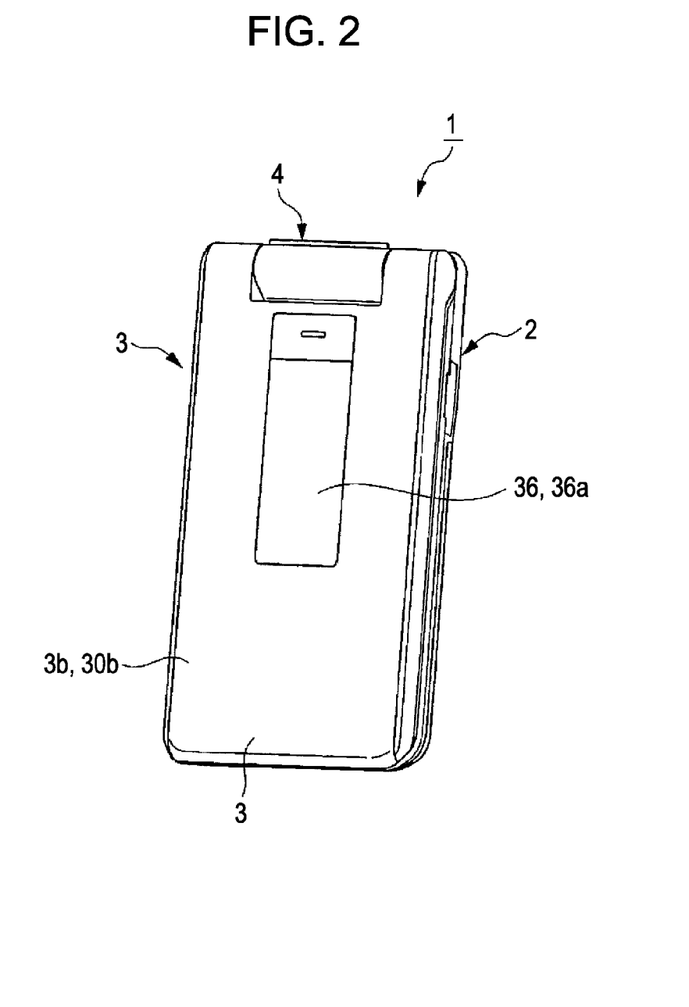
FIG. 2 is a perspective view of the mobile phone shown in FIG. 1 in a folded state, viewed from a rear-casing side of the display-unit housing.

As shown in FIGS. 1 and 2, a mobile phone 1 according to the present embodiment is a foldable mobile phone which includes an operation-unit housing 2 having a rectangular parallelepiped shape, a display-unit housing 3 having a rectangular parallelepiped shape, and a connecting member 4 which connects the operation-unit housing 2 and the display-unit housing 3 to each other.

An upper end portion of the operation-unit housing 2 and a lower end portion of the display-unit housing 3 are connected to each other by the connecting member 4 such that the operation-unit housing 2 and the display-unit housing 3 can be pivoted toward and away from each other. More specifically, the connecting member 4 connects the display-unit housing 3 and the operation-unit housing 2 to each other such that they can pivot toward and away from each other about a pivoting axis X. The mobile phone 1 can be set to an open state in which the operation-unit housing 2 and the display-unit housing 3 are pivoted away from each other and a folded state in which the operation-unit housing 2 and the display-unit housing 3 are stacked on each other by pivoting the operation-unit housing 2 and the display-unit housing 3, which are connected to each other by the connecting member 4, relative to each other.

The detailed structure of the display-unit housing 3 will now be described. As shown in FIGS. 1 and 2, the outer surface of the display-unit housing 3 is mainly defined by a front casing 30a and a rear casing 30b.

A front surface 3a of the display-unit housing 3 is mainly defined by the front casing 30a and a cover member 33. The front surface 3a is a surface that faces the operation-unit housing 2 when the mobile phone 1 is in the folded state. A rear surface 3b of the display-unit housing 3 is mainly defined by the rear casing 30b. The rear surface 3b is a surface opposite to the front surface 3a.

A main liquid crystal module 34 which displays various information is disposed in the display-unit housing 3. A main display unit 34a is disposed at one side of the main liquid crystal module 34 and is arranged such that the main display unit 34a is exposed at the front surface 3a of the display-unit housing 3 through an opening formed in the front casing 30a and the cover member 33, which is mainly formed of a transparent material.

A sound emitting unit 31 for emitting the voice of the person to whom the user is talking is provided on the front casing 30a. The sound emitting unit 31 is provided at an end of the display-unit housing 3 that is opposite to an end at which the connecting member 4 is provided in a longitudinal direction of the display-unit housing 3. In other words, the sound emitting unit 31 is disposed near an end of the mobile phone 1 at the display-chassis-3 side when the mobile phone 1 is in the open state.

As shown in FIG. 2, a sub liquid crystal module 36 for displaying various information is provided on the rear casing 30b of the display-unit housing 3. A sub display unit 36a is disposed at one side of the sub liquid crystal module 36 and is arranged such that the sub display unit 36a is exposed at the rear surface 3b of the display-unit housing 3 through a transparent portion of the rear casing 30b.

The main liquid crystal module 34 and the sub liquid crystal module 36 respectively include liquid crystal panels which function as the main display unit 34a and the sub display unit 36a; driving circuits for driving the liquid crystal panels; and light source units, such as backlights, which emit light from the back of the liquid crystal panels.

As shown in FIGS. 1 to 4, the outer surface of the operation-unit housing 2 is mainly defined by a front casing 21 and a rear casing 22, which function as housing members. A front surface 2a of the operation-unit housing 2 is defined by the front casing 21. The front surface 2a of the operation-unit housing 2 is a surface that faces the display-unit housing 3 when the mobile phone 1 is in the folded state. A rear surface 2b, which is a surface opposite to the front surface 2a, is defined by the rear casing 22.

Figure 3:
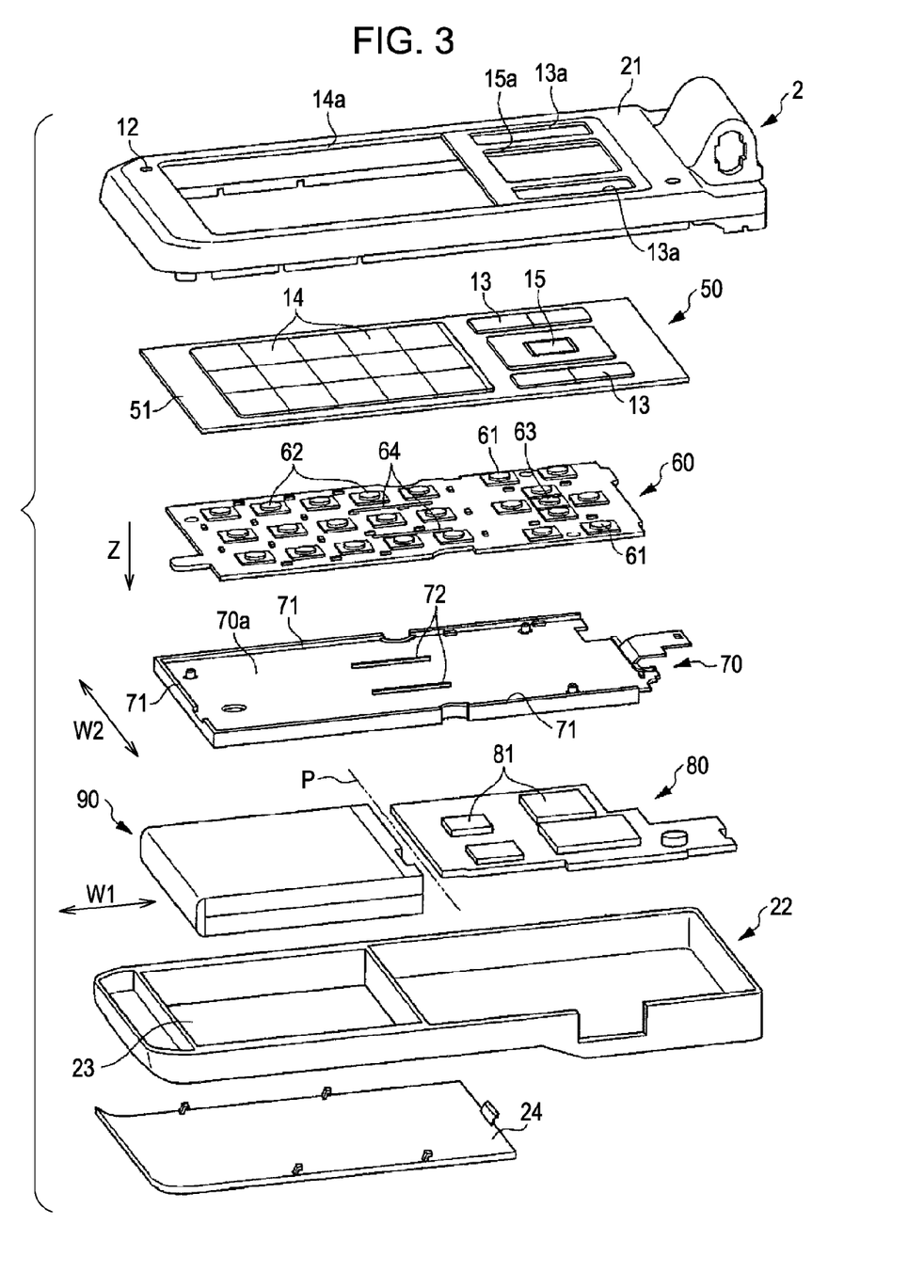
FIG. 3 is an exploded perspective view of the operation-unit housing shown in FIG. 1.
Figure 4:
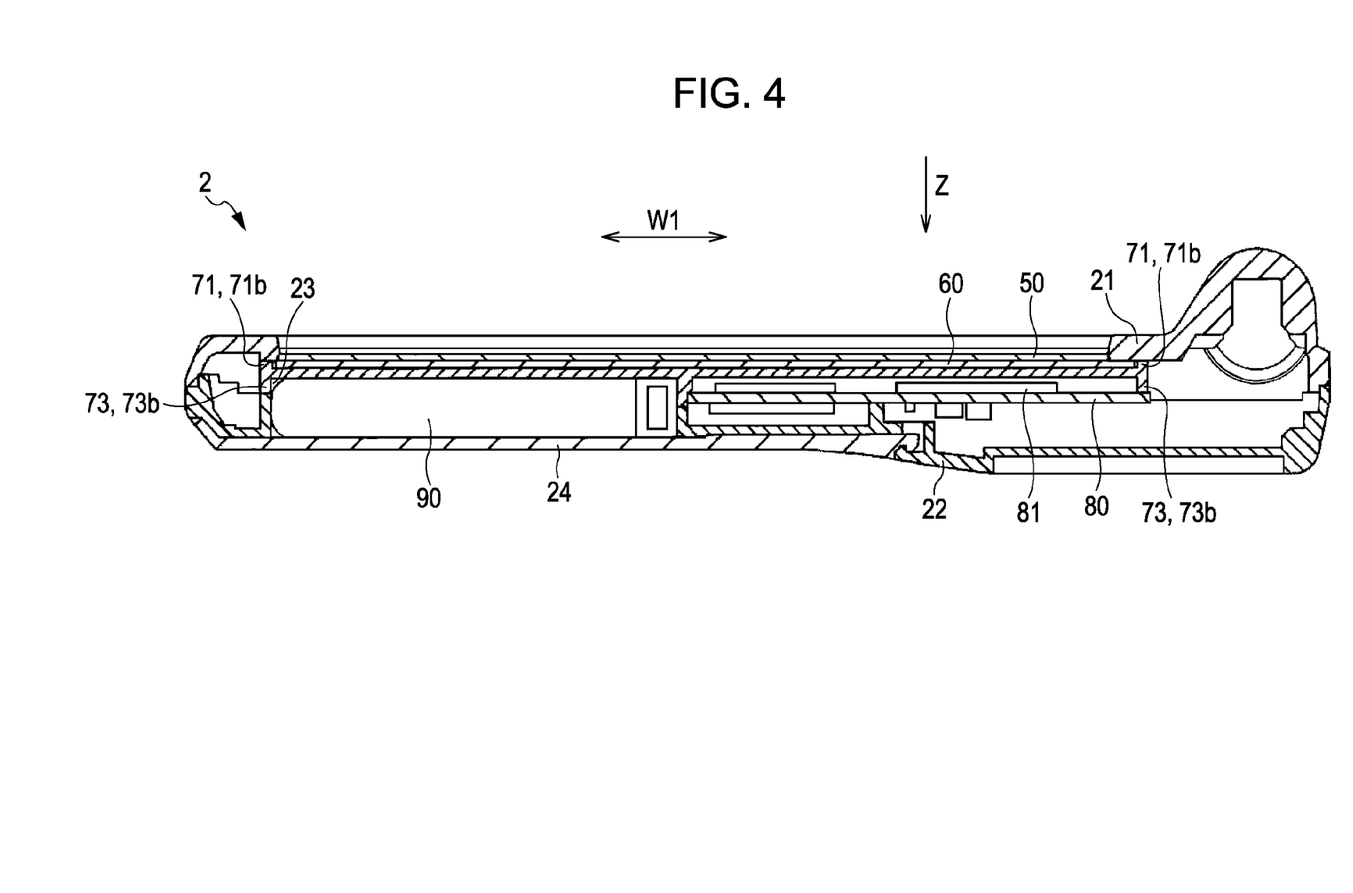
FIG. 4 is a sectional view of the operation-unit housing shown in FIG. 1 taken along a length direction of the operation-unit housing in a thickness direction thereof.

The operation-unit housing 2 accommodates a main circuit board 80, which functions as a first circuit board on which electronic components 81 are mounted, a shield casing 70, a key substrate 60, a key unit 50, and a battery 90. The shield casing 70 has an elongate shape and serves to cover the electronic components 81 mounted on the main circuit board 80. The key substrate 60 functions as a second circuit board having a plurality of key switches 61 to 63, and is stacked on a top surface 70a of the shield casing 70. The key unit 50 is used to press the key switches 61 to 63, and is stacked on the key substrate 60. The battery 90 is arranged at a bottom-surface-70b side (see FIG. 6B) of the shield casing 70.

The front casing 21 is arranged such that an operation key group 11 is exposed at the front surface 2a thereof. The operation key group 11 includes function-setting operation keys 13, input operation keys 14, and a decision operation key 15. The function-setting operation keys 13 are used to make various settings or to activate various functions such as an address directory function and a mail function. The input operation keys 14 include number keys for inputting, for example, phone numbers and characters for writing mails. The decision operation key 15 is used to confirm a decision in various operations or to scroll the display screen upward, downward, leftward, or rightward.

Functions which vary depending on whether the operation-unit housing 2 and the display-unit housing 3 are in the open or folded state or depending on the kind of application which is being activated are assigned to the keys included in the operation key group 11 (key assignment). In the mobile phone 1, when the user presses the keys included in the operation key group 11, functions assigned to the keys pressed by the user are executed.

A sound input unit 12 for receiving the voice of the user when the user talks on the mobile phone 1 is formed in the front surface 2a. The sound input unit 12 is formed at an end of the operation-unit housing 2 that is opposite to an end at which the connecting member 4 is provided in a longitudinal direction of the operation-unit housing 2. In other words, the sound input unit 12 is disposed near an end of the mobile phone 1 in a longitudinal direction thereof when the mobile phone 1 is in the open state.

An interface for transmitting and receiving data to and from an external apparatus (for example a host apparatus), headphone and microphone terminals, an interface for an attachable/detachable external memory, and a charging terminal used for charging the battery 90 are provided on side surfaces 2c of the operation-unit housing 2.

The shield casing 70 is a member which covers the electronic components 81 mounted on the main circuit board 80. The structure of the shield casing 70 will be described in detail below. The key substrate 60 is stacked on the top surface 70a of the shield casing 70 and includes the key switches 61, 62, and 63.

The key unit 50 is stacked on the key substrate 60, and includes pressers capable of pressing the key switches 61, 62, and 63 and key tops having operation surfaces. The pressers and the key tops are disposed on a sheet made of an elastic material, such as silicone. Key holes 13a, 14a, and 15a, which are openings at which the operation surfaces of the key unit 50 is exposed, are formed in the front casing 21. The front casing 21 and the rear casing 22 accommodate the main circuit board 80, the shield casing 70, the key substrate 60, and the key unit 50.

The outer surface of the operation-unit housing 2 is defined by the front casing 21 and the rear casing 22. The front casing 21 and the rear casing 22 are arranged such that inner recessed surfaces thereof face each other, and are joined to each other such that peripheral edges thereof are in contact with each other. The key unit 50, the key substrate 60, the shield casing 70, and the main circuit board 80 are disposed between the front casing 21 and the rear casing 22. In other words, the shield casing 70 is stacked on the main circuit board 80 so as to cover the main circuit board 80, the key substrate 60 is stacked on the shield casing 70, and the key unit 50 is stacked on the key substrate 60.

The electronic components 81 are mounted on a surface of the main circuit board 80 which faces the shield casing 70. The electronic components 81 are provided in a predetermined combination so as to form circuit blocks (not shown).

The shield casing 70 is made of a conductive material, and is provided to block the circuit blocks on the main circuit board 80. The shield casing 70 also serves to increase the strength of the operation-unit housing 2. The shield casing 70 is made of, but not limited to metal to ensure the strength thereof. However, the shield casing 70 may also be partially formed of synthetic resin by insert molding.

The length of the main circuit board 80 is about one half of the entire length of the shield casing 70 and is set to 30% to 70%, preferably 40% to 60%, of the entire length of the shield casing 70. The main circuit board 80, whose length is about one half of the length of the shield casing 70, is disposed in a section corresponding to about one half of the shield casing 70 near the connecting member 4. Thus, the main circuit board 80 is not disposed in a section corresponding to the other half of the shield casing 70 which is distant from the connecting member 4.

The detailed structures of the shield casing 70 and the key substrate 60 will now be described with reference to FIGS. 5 and 6. Here, the direction in which the main circuit board 80 and the battery 90 are arranged is defined as a "first direction" (W1 direction), and a direction substantially perpendicular to the first direction (W1 direction) is defined as a "second direction" (W2 direction). The W1 direction is parallel to the longitudinal direction of the shield casing 70 having an elongate shape, and the W2 direction is parallel to the width direction of the shield casing 70 having an elongate shape. The direction from the front surface 2a to the rear surface 2b of the operation-unit housing 2, that is, the direction from the top surface 70a to the bottom surface 70b of the shield casing 70 is defined as the "Z direction."

Figure 5:
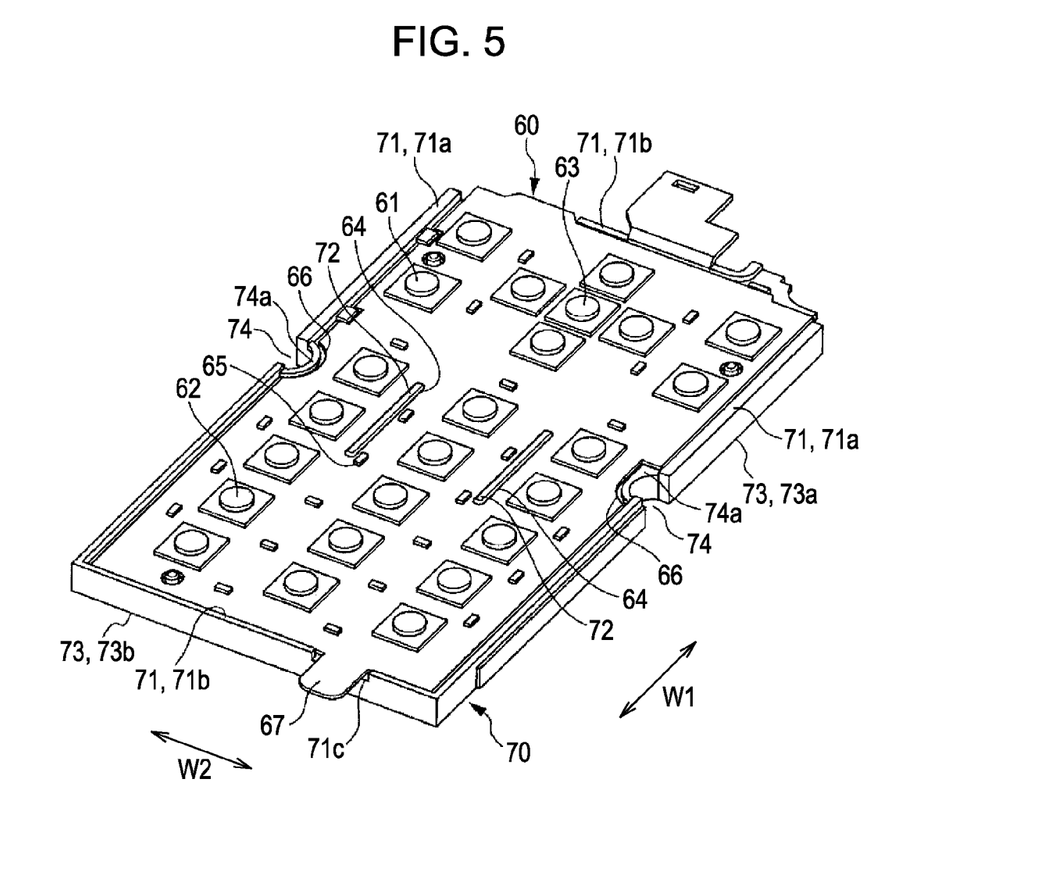
FIG. 5 is a perspective view illustrating the state in which a shield casing and a key substrate shown in FIG. 3 are stacked together.
Figure 6A:
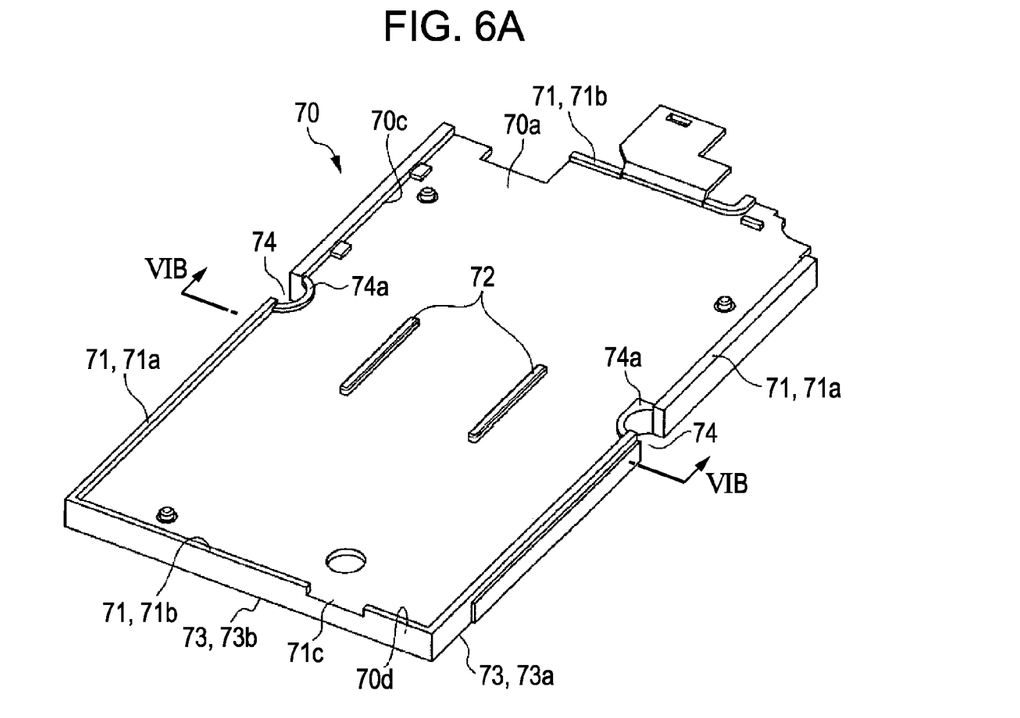
FIG. 6A is a perspective view of the shield casing shown in FIG. 5.
Figure 6B:
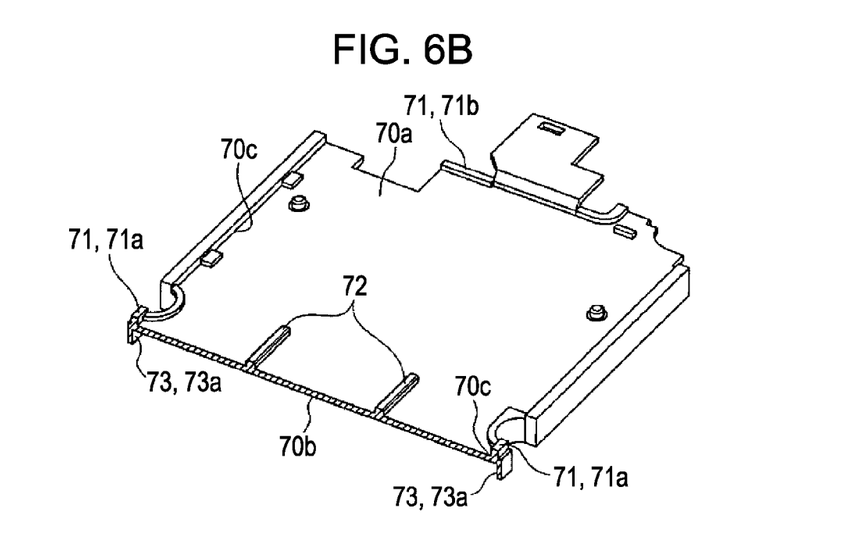
FIG. 6B is a sectional view of FIG. 6A taken along line VIB-VIB.

As shown in FIGS. 5 and 6, top peripheral ribs (second ribs) 71 are formed entirely or partially along side edges 70c (see FIG. 6) of the shield casing 70 which extend in the W1 direction. The top peripheral ribs 71 are formed so as to stand upright on the top surface 70a and extend in the W1 direction. The top peripheral ribs 71 may be formed entirely or partially along the side edges 70c of the shield casing 70 to increase the rigidity of the shield casing 70. However, according to the present embodiment, the top peripheral ribs 71 are partially formed along the side edges 70c due to various limitations.

Notches 74 having a substantially semi-arc shape are formed in the side edges 70c of the shield casing 70. Referring to FIG. 3, an imaginary boundary line P is drawn by extending a boundary line between the main circuit board 80 and the battery 90 in the W2 direction in a plan view of the main circuit board 80 in the Z direction. In this case, the notches 74 are formed at positions shifted from the boundary line P toward the connecting member 4 in the longitudinal direction of the shield casing 70. Therefore, an effect of preventing the breakage of the operation-unit housing 2 (details of this effect will be described below) is hardly reduced by the notches 74.

According to the present embodiment, the top peripheral ribs 71 are not formed in the areas where the notches 74 are provided, but are formed entirely along the remaining areas. Thus, the top peripheral ribs 71 are formed substantially entirely along the side edges 70c. Here, the expression "substantially entirely" means that the top peripheral ribs 71 are formed along 80% or more, preferably 90% or more, of the entire lengths of the side edges 70c.

Auxiliary ribs 74a, which have a substantially semi-arc shape and whose height is smaller than that of the top peripheral ribs 71, are provided along the notches 74 instead of the top peripheral ribs 71. The auxiliary ribs 74a extend continuously from the top peripheral ribs 71. Since the auxiliary ribs 74a are provided in areas where the top peripheral ribs 71 are not provided, the shield casing 70 can be prevented from being considerably weak in areas where the top peripheral ribs 71 are not provided.

The top peripheral ribs 71 are formed so as to cross the imaginary boundary line P in a plan view in the Z direction. The top peripheral ribs 71 may be as high and thick as possible as long as other components are not influenced. The height (height from the top surface 70a of the shield casing 70) of the top peripheral ribs 71 is, for example, about 0.4 mm to 1.5 mm. The thickness of the top peripheral ribs 71 is, for example, about 0.5 mm to 2.0 mm.

The top peripheral ribs 71 extend to an edge (edge extending in the W2 direction) 70d (see FIG. 6A) of the shield casing 70 having an elongate shape at an end opposite to an end where the connecting member 4 is provided. The top peripheral ribs 71 do not extend to an edge of the shield casing 70 at the end where the connecting member 4 is provided, but are partially provided along the edge of the shield casing 70 at the end where connecting member 4 is provided. Portions of the top peripheral ribs 71 that extend along the side edges 70c of the shield casing 70 are referred to as top side-edge ribs 71a and the remaining portions of the top peripheral ribs 71 are referred to as top end-edge ribs 71b. The top side-edge ribs 71a are divided from each other at the notches 74, and the top end-edge ribs 71b are divided from each other at a non-continuous portion 71c. A tongue piece 67, which will be described below, is disposed at the non-continuous portion 71c.

In addition to the top peripheral ribs 71 which stand upright on the top surface 70a, the shield casing 70 also includes bottom peripheral ribs 73 which stand upright on the bottom surface 70b. In a bottom view (plan view) of the operation-unit housing 2, the bottom peripheral ribs 73 are formed at substantially the same positions as the positions where the top peripheral ribs 71 are formed.

In other words, as shown in FIG. 6B, the top peripheral ribs 71 and the bottom peripheral ribs 73 are formed integrally with each other in the thickness direction of the shield casing 70, and are respectively formed so as to stand upright on the top and bottom surfaces of a substrate (substrate having the top surface 70a and the bottom surface 70b) of the shield casing 70. Therefore, the shield casing 70 is substantially H-shaped in cross section taken along the W2 direction.

The bottom peripheral ribs 73 include bottom side-edge ribs 73a formed at the same positions as the positions where the top side-edge ribs 71a of the top peripheral ribs 71 are formed. Although the top end-edge ribs 71b of the top peripheral ribs 71 are divided from each other at the non-continuous portion 71c, the bottom peripheral ribs 73 have a bottom end-edge rib 73b which extends continuously without being divided. The height (height from the bottom surface 70b of the shield casing 70) and the thickness of the bottom peripheral ribs 73 are the same as those of the above-described top peripheral ribs 71.

Inner ribs (first ribs) 72 are provided on the top surface 70a of the shield casing 70 so as to stand upright on the top surface 70a and extend in the W1 direction at positions separated from the side edges 70c toward the inside in the W2 direction. The inner ribs 72 extend between the main circuit board 80 and the battery 90 in a plan view in the Z direction. In other words, the inner ribs 72 overlap the main circuit board 80 or the battery 90 in a plan view in the Z direction.

The inner ribs 72 on the shield casing 70 may be as long, thick, and high as possible as long as the key switches 61 to 63 and light emitting diode (LED) units 65 are not influenced. The length of the inner ribs 72 is, for example, about 8 mm to 16 mm. The height of the inner ribs 72 (height from the top surface 70a of the shield casing 70) is, for example, about 0.4 mm to 1.2 mm. The thickness of the inner ribs 72 is, for example, about 0.5 mm to 2.0 mm.

The key substrate 60 is a flexible substrate obtained by placing wiring between a plurality of insulating layers (insulating films). The key substrate 60 includes the key switches 61, 62, and 63 arranged on a surface facing the key unit 50 at positions corresponding to the function-setting operation keys 13, the input operation keys 14, and the decision operation key 15, respectively, which function as key tops. The key switches 61, 62, and 63 include metal domes made of metal plates which are three-dimensionally curved in a bowl shape. When the metal domes are pressed at the apexes thereof, the metal domes come into contact with switch terminals included in electric circuits (not shown) printed on the surface of the key substrate 60 and become electrically connected to the switch terminals.

As shown in FIG. 5, through holes (insertion sections) 64 for receiving the inner ribs 72 are formed in the key substrate 60. The through holes 64 are elongate and have substantially the same size as (slightly larger than) the inner ribs 72. Therefore, the inner ribs 72 can be fitted to the through holes 64. When the inner ribs 72 are inserted into and fitted to the through holes 64, the through holes 64 serve as a positioning mechanism for positioning the key substrate 60 relative to the shield casing 70.

The through holes 64 formed in the key substrate 60 may be as long and wide as possible as long as the key switches 61 to 63 and the LED units 65 are not influenced. The length of the elongate through holes 64 is, for example, about 8.2 mm to 16.2 mm. The width of the elongate through holes 64 is, for example, 0.7 mm to 2.2 mm.

The through holes 64 extend between the main circuit board 80 and the battery 90 in a plan view in the Z direction. In other words, the through holes 64 overlap the main circuit board 80 or the battery 90 in a plan view in the Z direction. The through holes 64 are placed between the key switches 62 arranged in the W2 direction.

In the case where, for example, the key switches 62 are arranged on the key substrate 60 along three rows arranged in the W2 direction, each through hole 64 may be formed between two key switches 62 which are disposed next to each other in the W2 direction so that each inner rib 72 can be placed between two key switches 62 which are disposed next to each other in the W2 direction. When two inner ribs 72 are disposed as in this case, good strength balance can be obtained.

The tongue piece 67 projects in a tongue-like shape at an end of the key substrate 60 that is opposite to an end where the connecting member 4 is provided. In the state in which the shield casing 70 and the key substrate 60 are stacked together, the tongue piece 67 is positioned at the non-continuous portion 71c of the shield casing 70 and serves as an electrode for connecting the key substrate 60 and the main circuit board 80 to the ground.

Notches 66 are formed in the key substrate 60 at the side edges thereof at positions corresponding to the notches 74 formed in the shield casing 70. The notches 66 are formed such that no interference occurs with the auxiliary ribs 74a.

Therefore, in the state in which the shield casing 70 and the key substrate 60 are stacked together, no portion of the key substrate 60 other than the tongue piece 67 projects from the top peripheral ribs 71 of the shield casing 70 in the planar direction.

The LED units 65 are provided in association with the key switches 61 and 62 on the top surface (surface facing the key unit 50) of the key substrate 60. More specifically, the LED units 65 are positioned between the key switches 61 and 62. The LED units 65 emit light toward the key unit 50. More specifically, the LED units 65 emit light toward the function-setting operation keys 13 and the input operation keys 14, which have transparent portions, through the key unit 50. The light emitted from the LED units 65 passes through the transparent portions of the keys 13 and 14 and is emitted to the outside.

The key unit 50 is formed by adhering the key tops of the operation key group 11 on a surface of a base sheet 51 made of silicone rubber. The function-setting operation keys 13, the input operation keys 14, and the decision operation key 15 included in the operation key group 11 of the key unit 50 are positioned so as to face the corresponding key switches 61, 62, and 63 on the key substrate 60, and are disposed to be exposed at the key holes 13a, 14a, and 15a formed in the front casing 21.

The key holes 13a, 14a, and 15a are formed in the front surface 2a of the operation chassis 2 in the front casing 21. Pressing surfaces of the function-setting operation keys 13, pressing surfaces of the input operation keys 14, and a pressing surface of the decision operation key 15 are exposed at the key holes 13a, 14a, and 15a, respectively. When the thus-exposed pressing surfaces of the function-setting operation keys 13, the input operation keys 14, and the decision operation key 15 are depressed, the apexes of the metal domes provided on the corresponding key switches 61, 62, and 63 are also depressed. As a result, the metal domes come into contact with the switch terminals and are electrically connected thereto.

A battery accommodating space 23 which extends through the rear casing 22 in the thickness direction (direction from the rear surface to the front surface) is formed at one end of the rear casing 22. In the state in which the operation-unit housing 2 is assembled, the front side (side facing the shield casing 70) of the battery accommodating space 23 is covered with the bottom surface 70b of the shield casing 70. In addition, the rear side of the battery accommodating space 23 is covered with a lid member 24 that is detachably attached to the rear casing 22. When the battery 90 is installed into the operation-unit housing 2, the battery 90 is placed into the battery accommodating space 23 in the rear casing 22 from the rear side thereof and then the battery accommodating space 23 is closed by the lid member 24.

The main circuit board 80 and the battery 90 are arranged in the W1 direction without overlapping each other in a plane view in the Z direction (when the operation-unit housing 2 is viewed in the thickness direction thereof). The battery 90 is disposed such that the battery 90 faces an area of the bottom surface 70b of the shield casing 70 where the main circuit board 80 is not disposed.

The main circuit board 80 and the battery 90 are disposed so as not to overlap each other when the main circuit board 80 is viewed in the Z direction. The inner ribs 72 are provided so as to extend in the W1 direction at positions separated from the side edges of the shield casing 70, which extend in the W1 direction, in the W2 direction that is substantially perpendicular to the W1 direction. The inner ribs 72 extend between the main circuit board 80 and the battery 90 in a plan view in the Z direction.

Therefore, the boundary between the main circuit board 80 and the battery 90, which is weak, can be externally reinforced. Accordingly, the overall thickness of the operation-unit housing 2 can be further reduced and the rigidity of the shield casing 70 can be increased. As a result, the overall rigidity of the mobile phone 1 can be increased and the housing (the front casing 21 and the rear casing 22) does not easily break even when a force is applied to the operation-unit housing 2 in a direction in which the operation-unit housing 2 easily breaks. In addition, the boundary between the main circuit board 80 and the battery 90, which is weak, can be externally reinforced, and the operation-unit housing 2 can be formed to have a good strength balance.

In a plan view of the top peripheral ribs 71 in the Z direction, the top peripheral ribs 71 are formed so as to cross the imaginary boundary line P, which is obtained by extending the boundary line between the main circuit board 80 and the battery 90 in the W2 direction. Therefore, the risk that the housing (the front casing 21 and the rear casing 22) will break at the boundary between the main circuit board 80 and the battery 90, which is weak, can be particularly effectively reduced.

In addition, the through holes 64 capable of receiving the inner ribs 72 are formed in the key substrate 60, and the through holes 64 extend between the main circuit board 80 and the battery 90 in a plan view in the Z direction. Therefore, the influence of the distance by which the inner ribs 72 project can be eliminated by the through holes 64 and the inner ribs 72 are prevented from affecting the reduction in the thickness of the operation-unit housing 2. In addition, the through holes 64 serve as the positioning mechanism for positioning the key substrate 60 relative to the shield casing 70. Therefore, the key substrate 60 can be easily positioned relative to the shield casing 70.

The through holes 64 are formed between the key switches 62 arranged in the W2 direction on the key substrate 60. Therefore, the area of the key substrate 60 can be prevented from being increased due to the through holes 64.

The present invention is not limited to the above-described embodiment, and various modifications are possible. For example, although the battery 90 is directly in contact with the bottom surface 70b of the shield casing 70 without any components disposed therebetween, a thin member (for example, a bottom portion of the battery accommodating space) may be disposed between the battery 90 and the bottom surface 70b of the shield casing 70.

In addition, in the above-described embodiment, the connecting member 4 connects the display-unit housing 3 and the operation-unit housing 2 to each other such that they can pivot toward and away from each other about the pivoting axis X. However, the connecting member 4 may also have a two-axis hinge mechanism with which the display-unit housing 3 and the operation-unit housing 2 are connected to each other such that they can not only pivot toward and away from each other about the pivoting axis X but also can rotate relative to each other about a rotation axis perpendicular to the pivoting axis X.

In addition, it is not necessary that the portable electronic apparatus be a foldable type. For example, the portable electronic apparatus may also be a slidable type in which one of the operation-unit housing 2 and the display-unit housing 3 can be slid relative to the other one in a certain direction from the state in which the operation-unit housing 2 and the display-unit housing 3 are stacked on each other. Alternatively, the portable electronic apparatus may be of a rotational type (revolver type) in which one of the operation-unit housing 2 and the display-unit housing 3 can be rotated relative to the other one about a line which extends in a direction in which the operation-unit housing 2 and the display-unit housing 3 are stacked on each other.

In addition, although the insertion sections into which the first ribs (inner ribs 72) can be inserted are formed of the through holes 64 in the above-described embodiment, the present invention is not limited to this. For example, the insertion sections may also be recesses which open toward the first ribs.

The present invention can be applied to portable electronic apparatuses other than mobile phones, and can also be applied to electronic apparatuses other than portable electronic apparatuses. Examples of portable electronic apparatuses other than mobile phones include, for example, a personal handy phone system (PHS®), a portable game device, a portable navigation device, a personal digital assistant (PDA), a notebook personal computer, an electroluminescence (EL) display having an operation unit, and a liquid crystal display having an operation unit.

In addition, examples of electronic apparatuses other than portable electronic apparatuses include an electronic dictionary, an electronic calculator, an electronic notebook, a digital camera, a video camera, and a radio set. However, the present invention is not limited to the above-mentioned examples.

Figure 7:
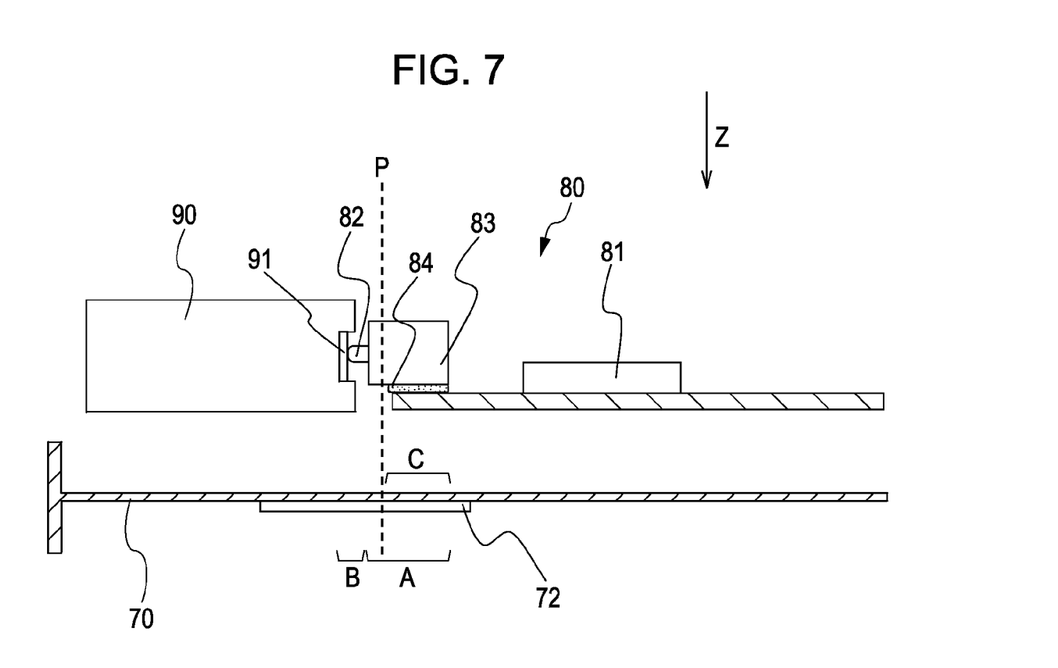
FIG. 7 is a sectional view of a mobile phone according to another embodiment of the present invention, illustrating the relationship between a main circuit board and a shield casing.

Another embodiment of the present invention will now be described. Here, structures different from those of the above-described embodiment and structures that are not described in the above-described embodiment will be basically described. The descriptions given herein may also be applied to the above-described embodiment. Referring to FIG. 7, which shows another embodiment, a main circuit board 80 includes a connection terminal 82, a holding member 83 which holds the connection terminal 82, and a fixing member 84 with which the holding member 83 is fixed to the main circuit board 80. The connection terminal 82 has spring characteristics, and presses a battery terminal 91 of a battery 90. Thus, the connection terminal 82 is electrically connected to the battery terminal 91. The connection terminal 82 and the holding member 83 project beyond the imaginary boundary line P in a direction from the main circuit board 80 toward the battery 90. The shield casing 70 has ribs 72 which extend from an area A which overlaps the holding member 83 when viewed in the Z direction to an area B which overlaps the battery terminal 91 when viewed in the Z direction. In the case where a plurality of battery terminals 91 are provided, the area B of the shield casing 70 which overlaps battery terminals 91 include an area which overlaps an area between the battery terminals 91.

The holding member 83 is fixed to the main circuit board 80 with the fixing member 84, such as thermoplastic or ultraviolet curing adhesive resin, a screw, or the like. A rib 72 may be provided also in an area C of the shield casing 70 which overlaps the fixing member (adhesive resin) 84.

Due to the rib 72, deflection of the main circuit board 80 caused when the key switches are pressed can be reduced. Therefore, the risk of contact failure between the connection terminal 82 and the battery terminal 91 can be reduced. The connection terminal may also be directly fixed to the main circuit board with the fixing member without using the holding member 83.

The invention claimed is:

1. An electronic apparatus, comprising:
   a first circuit board having a mounting surface;

a shield casing facing the mounting surface of the first circuit board and covering an electronic component mounted on the mounting surface;

a battery facing the shield casing at a position next to the first circuit board in a first direction which is parallel to the mounting surface of the first circuit board, wherein the position of the battery and the first circuit board define a gap;

a first rib on an interior surface of the shield casing, the first rib extending in the first direction, one end of the first rib being disposed at a position corresponding to the first circuit board in a second direction, the other end of the first rib being disposed at a position corresponding to the battery in the second direction, the second direction being perpendicular to the mounting surface, wherein the first rib bridges the gap defined by the position of the battery and the first circuit board and wherein the interior surface of the shield casing is on a side opposite to a first surface which faces the first circuit board and the battery;

a second circuit board stacked on the interior surface of the shield casing; and an engaging member on the second circuit board, the member engaged with the first rib, wherein the engaging member comprises a hole in the second circuit board and at least a portion of the first rib extends through said hole when the engaging member is engaged with the first rib.

2. The electronic apparatus according to claim 1, further comprising:

a second rib on the shield casing, the second rib extending in the first direction at an end of the shield casing and in a third direction which is perpendicular to the first direction.

3. The electronic apparatus according to claim 1, wherein the second circuit board includes a key switch.

4. The electronic apparatus according to claim 3, wherein the key switch includes a plurality of key switches arranged on the second circuit board in the third direction, and the engaging member is disposed between the key switches.

5. The electronic apparatus according to claim 1, wherein the first rib includes a plurality of first ribs arranged on the shield casing in a third direction which is perpendicular to the first direction.

6. The electronic apparatus according to claim 1, wherein the battery includes a battery terminal, wherein the first circuit board includes a connection terminal unit which is electrically connected to the battery terminal, and wherein the first rib on the shield casing is disposed at a position corresponding to the battery terminal and the connection terminal unit in the second direction.

7. The electronic apparatus according to claim 6, wherein the connection terminal unit includes a connection terminal and a fixing member with which the connection terminal is fixed to the first circuit board, and wherein the first rib is disposed at a position corresponding to the fixing member.

\* \* \* \* \*